US012713186B2

(12) United States Patent
Burwinkel et al.

(10) Patent No.: US 12,713,186 B2
(45) Date of Patent: Aug. 18, 2026

(54) USER INTERFACE CONTROL USING VIBRATION SUPPRESSION

(71) Applicant: Starkey Laboratories, Inc., Eden Prairie, MN (US)

(72) Inventors: Justin Burwinkel, Eden Prairie, MN (US); Andy S. Lin, Chanhassen, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 131 days.

(21) Appl. No.: 18/588,826

(22) Filed: Feb. 27, 2024

(65) Prior Publication Data

US 2024/0298120 A1 Sep. 5, 2024

Related U.S. Application Data

(60) Provisional application No. 63/487,703, filed on Mar. 1, 2023.

(51) Int. Cl.
*G06F 3/0346* (2013.01)
*H04R 25/00* (2006.01)

(52) U.S. Cl.
CPC ............ *H04R 25/30* (2013.01); *H04R 25/45* (2013.01)

(58) Field of Classification Search
CPC ......... H04R 25/30; H04R 25/45; G06F 1/163; G06F 3/017; G06F 3/0346
USPC ...................................................... 381/61–63
See application file for complete search history.

(56) References Cited

U.S. PATENT DOCUMENTS

| | | | | |
|---|---|---|---|---|
| 9,549,264 | B2 | 1/2017 | Kim et al. | |
| 2011/0096036 | A1* | 4/2011 | McIntosh | G06F 3/043 345/177 |
| 2011/0200213 | A1 | 8/2011 | Knox | |
| 2014/0348334 | A1* | 11/2014 | Ko | H04R 29/001 381/58 |
| 2020/0314525 | A1 | 10/2020 | Thielen | |

FOREIGN PATENT DOCUMENTS

| | | | |
|---|---|---|---|
| EP | 3627854 | A1 | 3/2020 |
| WO | 2015180796 | A1 | 12/2015 |
| WO | 2021016094 | A1 | 1/2021 |

OTHER PUBLICATIONS

Extended Search Report from counterpart European Application No. 24160596.3 dated Aug. 2, 2024, 7 pp.
Response to Extended Search Report dated Aug. 2, 2024, from counterpart European Application No. 24160596.3 filed Feb. 26, 2025, 20 pp.

* cited by examiner

*Primary Examiner* — George C Monikang
(74) *Attorney, Agent, or Firm* — Shumaker & Sieffert, P.A.

(57) ABSTRACT

A hearing instrument may generate vibration, via a vibration unit, in response to determining a notification for a user of the hearing instrument. The hearing instrument may obtain a motion signal from one or more sensors indicative of the vibration generated by the hearing instrument. The hearing instrument determines, based on the motion signal, whether the user has touched the hearing instruments while the vibration unit is generating the vibration. The hearing instrument, responsive to a determination that the user has touched the hearing instrument while the vibration unit is generating vibration, executes a command.

20 Claims, 6 Drawing Sheets

USER INTERFACE CONTROL USING VIBRATION SUPPRESSION

This application claims the benefit of U.S. Provisional Patent Application No. 63/487,703, filed 1 Mar. 2023, the entire contents of which is incorporated herein by reference.

TECHNICAL FIELD

This disclosure relates to hearing instruments.

BACKGROUND

Hearing instruments are devices designed to be worn on, in, or near one or more of a user's ears. Common types of hearing instruments include hearing assistance devices (e.g., "hearing aids"), earbuds, headphones, hearables, personal sound amplifiers, osseointegrated hearing devices, cochlear implants, brainstem implants, and so on. In some examples, a hearing instrument may, at least in part, be implanted or integrated into a user. Some hearing instruments may generate vibration via one or more components.

SUMMARY

This disclosure describes techniques for controlling hearing instruments through detection of suppressed vibration output. The hearing instruments may generate, via one or more components, vibration and determine that a user has suppressed the vibration.

As described herein, an ear-wearable device may determine, based on motion signals from one or more sensors of the ear-wearable device that a user is interacting with the controls of the ear-wearable device. The user may provide input to the ear-wearable device (e.g., pressing their finger against the side of the device) in response to the generation of vibration by the ear-wearable device.

In one example, this disclosure describes a hearing instrument comprising a vibration unit, a motion sensor, and one or more processors configured to cause the vibration unit to generate a vibration, obtain, from the motion sensor, a motion signal indicative of motion of one or more parts to the hearing instrument while the vibration unit is generating the vibration, determine, based on the motion signal, whether a user has further touched the hearing instrument while the vibration unit is generating the vibration and execute a command in response to determining that the user has further touched the hearing instrument while the vibration unit is generating the vibration.

In another example, this disclosure describes a method comprising causing, by a hearing instrument, a vibration unit to generate a vibration, obtaining, by the hearing instrument and from a motion sensor, a motion signal indicative of a motion of one or more parts of the hearing instrument while the vibration unit is generating the vibration, determining, by the hearing instrument and based on the motion signal, while the vibration unit is generating the vibration, whether a user has further touched the hearing instrument while the vibration unit is generating the vibration, and executing, by the hearing instrument, a command in response to determining that the user has touched the hearing instrument while the vibration unit is generating the vibration.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

A hearing instrument may include one or more vibration units that generate vibration and include one or more motion sensors that received motion signals indicative of user dampening. For example, the hearing instruments may include one or more vibration units, motion sensors (e.g., inertial measurement units (IMUs), accelerometers, gyroscopes, barometers, microphones, and the like), speakers, microphones, or other input devices. The hearing instrument may generate vibration via the one or more vibration units and measure the vibration via the one or more motion sensors. The hearing instrument may determine, via the motion sensors, that a user has dampened the vibration and execute a command in response to the determination. Additionally, the hearing instrument may include one or more speakers or one or more vibration units that generate an audio output and one or more microphones that measure audio signals. The hearing instrument may determine, via the microphones, that the user has dampened the one or more of audio output or vibration output generated by the one or more speakers or vibration units and execute a command in response to the determination.

In many cases, hearing instruments may have buttons located on the hearing instrument which are relatively small due to the size constraints of hearing instruments. Further, users of hearing instruments may have disabilities that make it difficult to locate and operate physical interfaces located on the face or casing of hearing instruments. The ability of hearing instruments to detect user dampening of vibration allows for the hearing instruments to receive input from the user touching the side of the hearing instruments instead of requiring the user to touch a small physical button or switch located on the hearing instrument.

Figure 1:
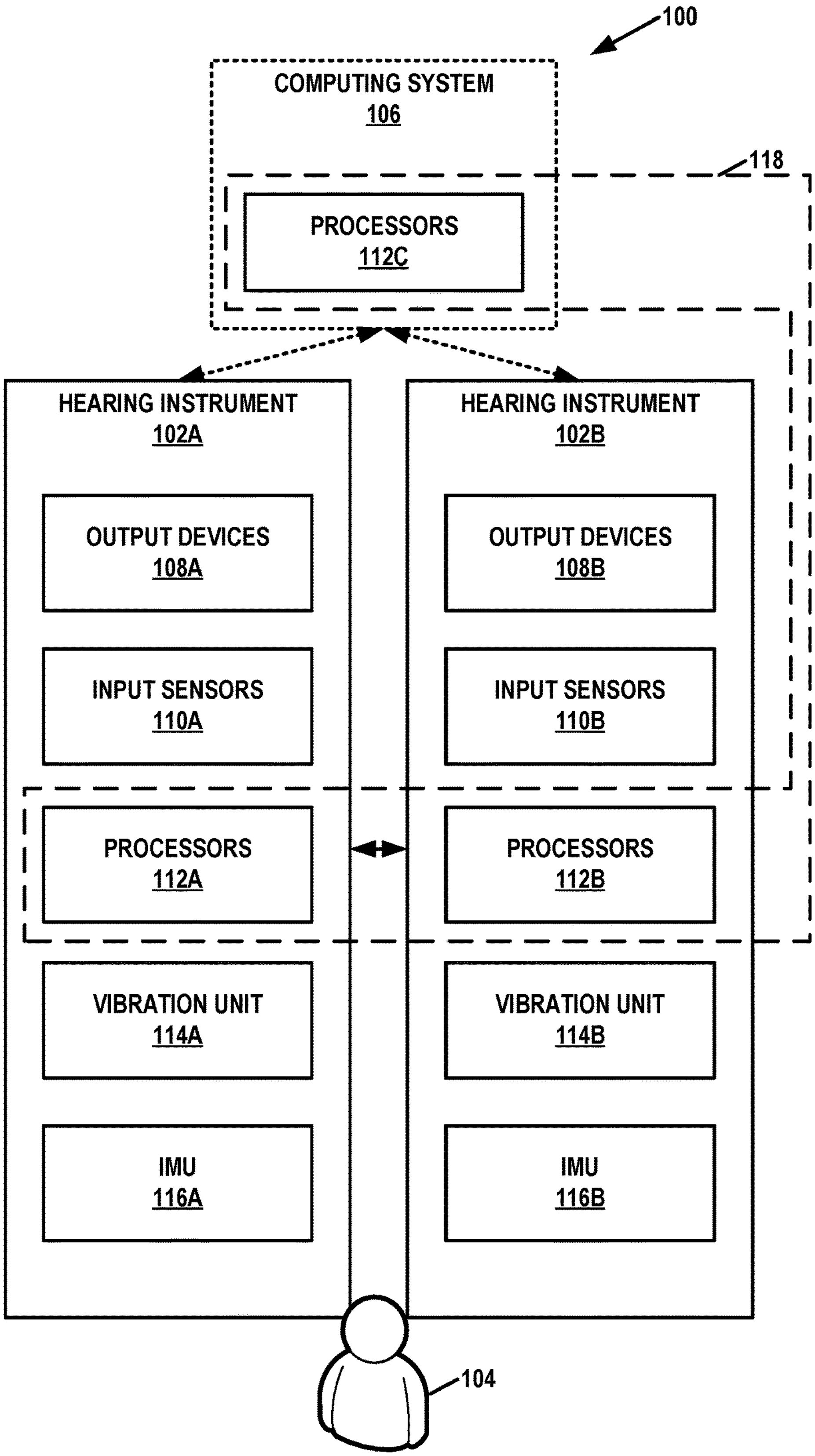
FIG. 1 is a conceptual diagram illustrating an example system that includes one or more hearing instruments, in accordance with one or more techniques of this disclosure.

FIG. 1 is a conceptual diagram illustrating an example system 100 that includes hearing instruments 102A and 102B, in accordance with one or more techniques of this disclosure. This disclosure may refer to hearing instruments 102A and 102B collectively, as "hearing instruments 102." A user 104 may wear hearing instruments 102. In some instances, user 104 may wear a single hearing instrument. In other instances, user 104 may wear two hearing instruments, with one hearing instrument for each ear of user 104.

Hearing instruments 102 may include one or more of various types of devices that are configured to provide auditory stimuli to user 104 and that are designed for wear and/or implantation at, on, near, or in relation to the physiological function of an ear of user 104. Hearing instruments 102 may be worn, at least partially, in the ear canal or concha. One or more of hearing instruments 102 may include behind the ear (BTE) components that are worn behind the ears of user 104. In some examples, hearing instruments 102 include devices that are at least partially implanted into or integrated with the head or neck area of user 104, e.g., the skull. In some examples, one or more of hearing instruments 102 provides auditory stimuli to user 104 via a bone conduction pathway.

In any of the examples of this disclosure, each of hearing instruments 102 may include a hearing assistance device. Hearing assistance devices include devices that help user 104 hear sounds in the environment of user 104. Example types of hearing assistance devices may include hearing aid devices, Personal Sound Amplification Products (PSAPs), cochlear implant systems (which may include cochlear implant magnets, cochlear implant transducers, and cochlear implant processors), bone-anchored or osseointegrated hearing aids, and so on. In some examples, hearing instruments 102 are over-the-counter, direct-to-consumer, or prescription devices. Furthermore, in some examples, hearing instruments 102 include devices that provide auditory stimuli to user 104 that correspond to artificial sounds or sounds that are not naturally in the environment of user 104, such as recorded music, computer-generated sounds, or other types of sounds. For instance, hearing instruments 102 may include so-called "hearables," earbuds, earphones, or other types of devices that are worn on or near the ears of user 104. Some types of hearing instruments provide auditory stimuli to user 104 corresponding to sounds from the user's environment and also artificial sounds. In some examples, hearing instruments 102 may include cochlear implants or brainstem implants. In some examples, hearing instruments 102 may use a bone conduction pathway to provide auditory stimulation. In some examples, one or more of hearing instruments 102 includes a housing or shell that is designed to be worn in the ear for both aesthetic and functional reasons and encloses the electronic components of the hearing instrument. Such hearing instruments may be referred to as in-the-ear (ITE), in-the-canal (ITC), completely-in-the-canal (CIC), or invisible-in-the-canal (IIC) devices. In some examples, one or more of hearing instruments 102 may be behind-the-ear (BTE) devices, which include a housing worn behind the ear that contains all of the electronic components of the hearing instrument, including the receiver (e.g., a speaker). The receiver conducts sound to an earbud inside the ear via an audio tube. In some examples, one or more of hearing instruments 102 are receiver-in-canal (RIC) hearing-assistance devices, which include housings worn behind the ears that contains electronic components and housings worn in the ear canals that contains receivers.

Hearing instruments 102 may implement a variety of features that help user 104 hear better. For example, hearing instruments 102 may amplify the intensity of incoming sound, amplify the intensity of certain frequencies of the incoming sound, translate or compress frequencies of the incoming sound, receive wireless audio transmissions from hearing assistive listening systems and hearing aid accessories (e.g., remote microphones, media streaming devices, and the like), and/or perform other functions to improve the hearing of user 104. In some examples, hearing instruments 102 implement a directional processing mode in which hearing instruments 102 selectively amplify sound originating from a particular direction (e.g., to the front of user 104) while potentially fully or partially canceling sound originating from other directions. In other words, a directional processing mode may selectively attenuate off-axis unwanted sounds. The directional processing mode may help user 104 understand conversations occurring in crowds or other noisy environments. In some examples, hearing instruments 102 use beamforming or directional processing cues to implement or augment directional processing modes.

In some examples, hearing instruments 102 reduce noise by canceling out or attenuating certain frequencies. Furthermore, in some examples, hearing instruments 102 may help user 104 enjoy audio media, such as music or sound components of visual media, by outputting sound based on audio data wirelessly transmitted to hearing instruments 102.

Hearing instruments 102 may be configured to communicate with each other. For instance, in any of the examples of this disclosure, hearing instruments 102 may communicate with each other using one or more wireless communication technologies. Example types of wireless communication technology include Near-Field Magnetic Induction (NFMI) technology, 900 MHz technology, BLUETOOTH™ technology, WI-FI™ technology, audible sound signals, ultrasonic communication technology, infrared communication technology, inductive communication technology, or other types of communication that do not rely on wires to transmit signals between devices. In some examples, hearing instruments 102 use a 2.4 GHz frequency band for wireless communication. In examples of this disclosure, hearing instruments 102 may communicate with each other via non-wireless communication links, such as via one or more cables, direct electrical contacts, and so on.

As shown in the example of FIG. 1, system 100 may also include a computing system 106. In other examples, system 100 does not include computing system 106. Computing system 106 includes one or more computing devices, each of which may include one or more processors. For instance, computing system 106 may include one or more mobile devices (e.g., smartphones, tablet computers, etc.), server devices, personal computer devices, handheld devices, wireless access points, smart speaker devices, smart televisions, medical alarm devices, smart key fobs, smartwatches, motion or presence sensor devices, smart displays, screen-enhanced smart speakers, wireless routers, wireless communication hubs, prosthetic devices, mobility devices, special-purpose devices, accessory devices, and/or other types of devices. Accessory devices may include devices that are configured specifically for use with hearing instruments 102. Example types of accessory devices may include charging cases for hearing instruments 102, storage cases for hearing instruments 102, media streamer devices, phone streamer devices, external microphone devices, external telecoil devices, remote controls for hearing instruments 102, and other types of devices specifically designed for use with hearing instruments 102.

Actions described in this disclosure as being performed by computing system 106 may be performed by one or more of the computing devices of computing system 106. One or more of hearing instruments 102 may communicate with computing system 106 using wireless or non-wireless communication links. For instance, hearing instruments 102 may communicate with computing system 106 using any of the example types of communication technologies described elsewhere in this disclosure.

In the example of FIG. 1, hearing instrument 102A includes a speaker 108A, input sensors 110A, a set of one or more processors 112A, a vibration unit 114A, and an IMU 116A. Hearing instrument 102B includes a speaker 108B, input sensors 110B, a set of one or more processors 112B, a vibration unit 114B, and an IMU 116B. This disclosure may refer to speaker 108A and speaker 108B collectively as "speakers 108." This disclosure may refer to input sensors 110A and input sensors 110B collectively as "input sensors 110." This disclosure may refer to vibration unit 114A and vibration unit 114B collectively as "vibration units 114". In some examples, speakers 108 may act as vibration units 114. This disclosure may refer to IMU 116 and IMU 116B collectively as "IMU 116". Computing system 106 includes a set of one or more processors 112C. Processors 112C may be distributed among one or more devices of computing system 106. This disclosure may refer to processors 112A, 112B, and 112C collectively as "processors 112." Processors 112 may be implemented in circuitry and may include microprocessors, application-specific integrated circuits, digital signal processors, artificial intelligence (AI) accelerators, or other types of circuits.

As noted above, hearing instruments 102A, 102B, and computing system 106 may be configured to communicate with one another. Accordingly, processors 112 may be configured to operate together as a processing system 118. Thus, discussion in this disclosure of actions performed by processing system 118 may be performed by one or more processors in one or more of hearing instrument 102A, hearing instrument 102B, or computing system 106, either separately or in coordination. Moreover, it should be appreciated that, in some examples, processing system 118 does not include each of processors 112A, 112B, or 112C. For instance, processing system 118 may be limited to processors 112A and not processors 112B or 112C.

Figure 2:
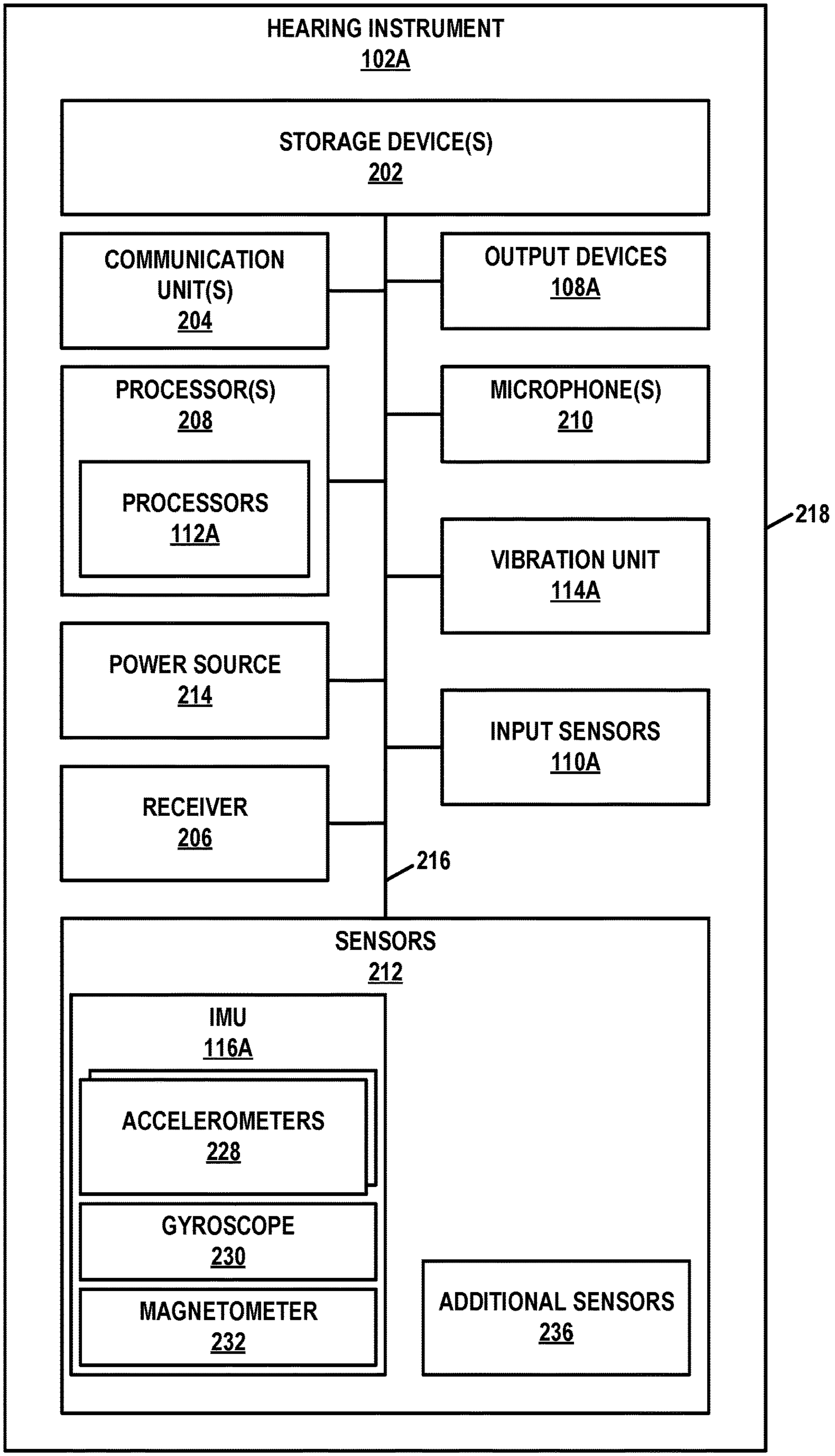
FIG. 2 is a block diagram illustrating example components of a hearing instrument, in accordance with one or more techniques of this disclosure.
Figure 3:
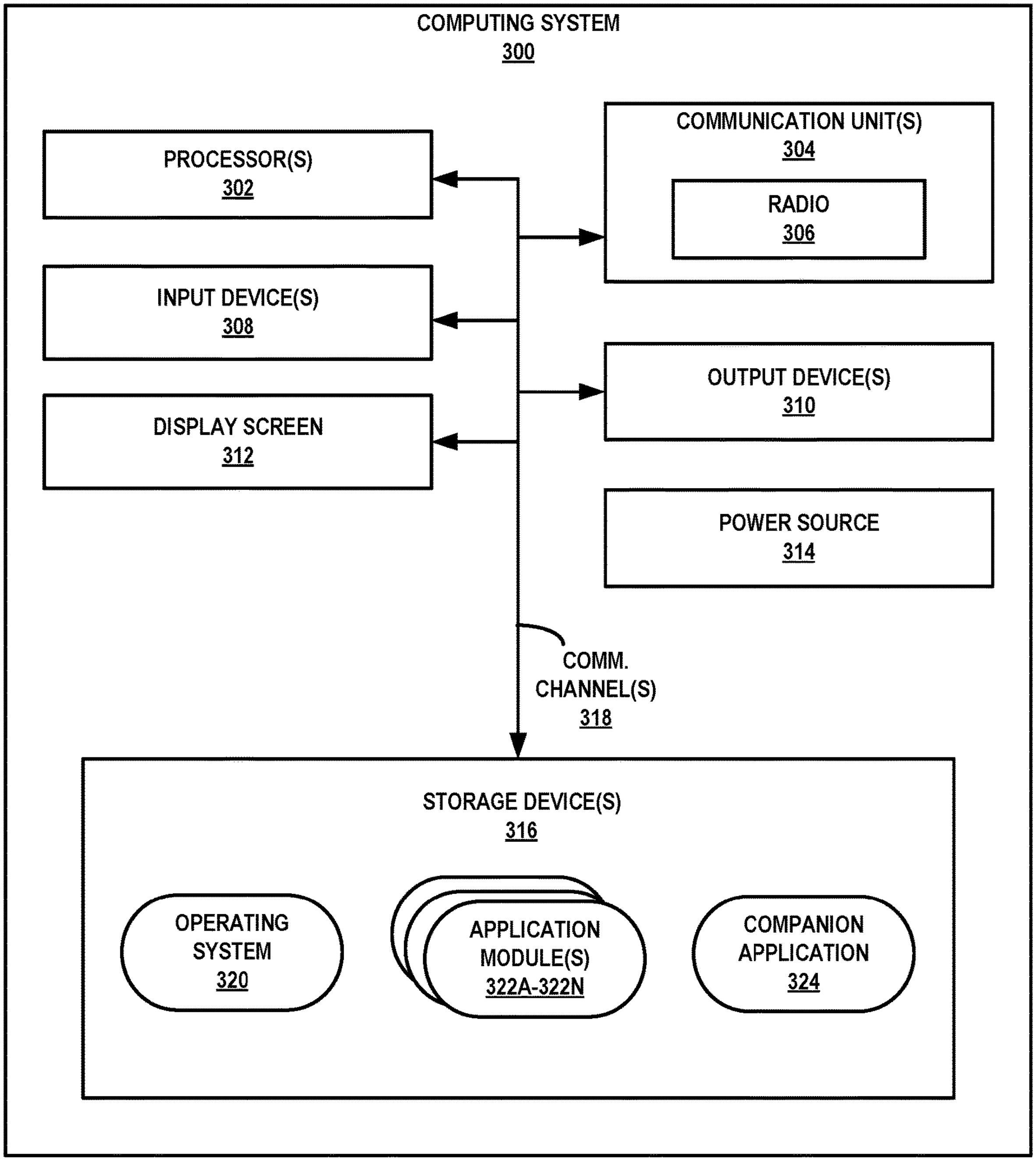
FIG. 3 is a block diagram illustrating an example computing system.

It will be appreciated that hearing instruments 102 and computing system 106 may include components in addition to those shown in the example of FIG. 1, e.g., as shown in the examples of FIG. 2 and FIG. 3. For instance, each of hearing instruments 102 may include one or more additional microphones configured to detect sound in an environment of user 104. The additional microphones may include omnidirectional microphones, directional microphones, own-voice detection sensors, or other types of microphones. Input sensors 110 may include one or more types of sensors such as rocker switches, physical buttons, capacitive touch interface, accelerometer, or other type of input sensor. Hearing instruments 102 may receive input from through one or more of input sensors 110. Hearing instruments 102 may receive input from user 104 via one of hearing instruments 102 or both of hearing instruments 102.

Hearing instruments 102 may generate vibration via vibration units 114. Hearing instruments 102 may generate vibration in one or more patterns. Hearing instruments 102 may generate vibration in response to receiving data regarding a notification from computing system 106. For example, computing system 106 may generate data regarding a notification (e.g., a text message received by computing system 106) and provide the data regarding the notification to hearing instruments 102. Hearing instruments 102 generate vibration via vibration units 114 in response to the receipt of the data.

Hearing instruments 102 may generate vibration to request input. In an example, hearing instruments 102 may determine that user 104 may benefit from alternate sound processing settings. Responsive to the determination, hearing instruments 104 may cause vibration units 114 to generate vibration. In an example, hearing instruments 102 determine that user 104 has entered a loud area (e.g., stepping outside to a busy street, construction equipment begins operating nearby, entering a noisy restaurant, and other examples of changes in ambient noise levels) and that user 104 may benefit from hearing instruments 102 entering an active noise cancellation mode. Responsive to the determination, hearing instruments 102 cause one or more of vibration units 114 to generate vibration.

During the generation of vibration, hearing instruments 102 may use one or more sensors, such as IMUs 116 and input sensors 110, to obtain a motion signal indicative of motion of hearing instruments 102 while vibration units 114 are generating the vibration. Additionally, hearing instruments 102 may determine, based on the motion signal, whether the vibration has been dampened. Hearing instruments 102 may determine that user 104 has dampened the vibration through changes in vibration observed by input sensors 110 and vibration units 114. For example, hearing instruments 102 may determine, based on a motion signal indicative of motion of a hearing instrument, that user 104 has touched the hearing instrument while the vibration unit of the hearing instrument is generating the vibration. Touching the hearing instrument may dampen the vibration generated by hearing instruments 102.

Hearing instruments 102 may cause the generation of vibration for a predefined period of time and determine whether input has been received from user 104 during the period of time. In an example, in response to determining that user 104 may benefit from the activation of an active noise cancelling mode, hearing instruments 102 are configured to generate vibration for 5 seconds to request that user 104 place hearing instruments 102 in the active noise cancelling mode. Hearing instruments 102 may then generation vibration for 5 seconds and sample, measure, or otherwise obtain the motion signal consistent with the vibration to determine whether input has been received that is consistent with user 104 dampening the vibration. If hearing instruments 102 determine that input has not been received after 5 seconds, hearing instruments 102 may cease generating vibration and do not enter the active noise canceling mode. If hearing instruments 102 determine that input has been received consistent with user 104 dampening the vibration, hearing instruments 102 cease generating vibration and enter the active noise cancelling mode.

Hearing instruments 102 may cause vibration units 114 to generate a second vibration. Hearing instruments may obtain, via one or more sensors such as IMUs 116 and input sensors 102 obtain a second motion signal while vibration units 114 are generating the second vibration and user 104 is not touching hearing instruments 102. Hearing instruments 102 may then, as part of determining whether user 104 has touched hearing instruments 102, compare the first motion signal and the second motion signal. Responsive to the comparison of the first motion signal and the second motion signal, hearing instruments 102 may determine whether user 104 has further touched hearing instruments 102. Hearing instruments 102 may generate the second vibration and the second motion signal before the first vibration and first motion signal to determine the baseline. Hearing instruments 102 may then compare a second motion signal to the baseline to determine whether input has been received consistent with user 104 touching hearing instruments 102.

Hearing instruments 102 may cause vibration units 114 to generate a second vibration after generating a first vibration. Hearing instruments 102 may obtain, via one or more sensors such as IMUs 116 and input sensors 102, a second motion signal while vibration units 114 are generating the second vibration. Hearing instruments 102 may determine, based on the second motion signal, that user 104 did not further touch hearing instruments 102 prior to the expiration of a time period. Responsive to the determination that user 104 has not touched hearing instruments 102 prior to the expiration of the time period, hearing instruments 102 may refrain from executing the command. Hearing instruments 102, responsive to determining that user 104 has not touched hearing instruments 102, may execute a second command, where the command hearing instruments 102 refrained from executing is a first command.

Hearing instruments 102 may communicate with each other data regarding user input over one or more communication protocols. In an example, hearing instrument 102A receives input from input sensors 110A consistent with user 104 touching the side of hearing instrument 102. Hearing instrument 102A provides data regarding the input to hearing instrument 102B. Hearing instrument 102B may then determine if user 104 is providing input via input sensors 110B. Responsive to a determination that user 104 is also providing input to input sensors 110B, processors 112B may process the input from user 104 and determine user 104's intent. Hearing instrument 102B may communicate with hearing instrument 102A to process the user input. Processors 112A may additionally process the user input. Further, hearing instruments 102 may provide the data regarding the input to computing system 106. Processors 112C may process the user input and provide the results to hearing instruments 102.

FIG. 2 is a block diagram illustrating example components of hearing instrument 102A, in accordance with one or more aspects of this disclosure. Hearing instrument 102B may include the same or similar components of hearing instrument 102A shown in the example of FIG. 2. Thus, the discussion of FIG. 2 may apply with respect to hearing instrument 102B. In the example of FIG. 2, hearing instrument 102A includes one or more storage devices 202, one or more communication units 204, receiver 206, one or more processors 208, one or more of input sensors 110A, one or more of output devices 108A, vibration unit 114A, one or more microphone(s) 210, a set of sensors 212, a power source 214, and one or more communication channels 216. Communication channels 216 provide communication between storage devices 202, communication unit(s) 204, speakers 206, output devices 108A, processor(s) 208, microphone(s) 210, input sensors 110A, microphone(s) 210, and sensors 212. Components 202, 204, 206, 208, 108A, 210, 110A, 114A, and 212 may draw electrical power from power source 214.

In the example of FIG. 2, each of components 202, 204, 206, 208, 108A, 210, 110A, 212, 114A and 214 are contained within a single housing 218. For instance, in examples where hearing instrument 102A is a BTE device, each of components 202, 204, 206, 208, 108A, 210, 110A, 212, 114A and 214 may be contained within a behind-the-ear housing. In examples where hearing instrument 102A is an ITE, ITC, CIC, or IIC device, each of components 202, 204, 206, 208, 108A, 210, 110A, 212, 114A and 214 may be contained within an in-ear housing. However, in other examples of this disclosure, components 202, 204, 206, 208, 108A, 210, 110A, 212, 114A and 214 are distributed among two or more housings. For instance, in an example where hearing instrument 102A is a RIC device, one or more of microphone(s) 210, and one or more of sensors 212 may be included in an in-ear housing separate from a behind-the-ear housing that contains the remaining components of hearing instrument 102A. In such examples, a RIC cable may connect the two housings.

Furthermore, in the example of FIG. 2, sensors 212 include an inertial measurement unit (IMU) 116A that is configured to generate data regarding the motion of hearing instrument 102A. IMU 116A may include a set of sensors. For instance, in the example of FIG. 2, IMU 116A includes one or more accelerometers 228, a gyroscope 230, a magnetometer 232, combinations thereof, and/or other sensors for determining the motion of hearing instrument 102A. Furthermore, in the example of FIG. 2, hearing instrument 102A may include one or more additional sensors 236. Additional sensors 236 may include a photoplethysmography (PPG) sensor, blood oximetry sensors, blood pressure sensors, electrocardiograph (EKG) sensors, body temperature sensors, electroencephalography (EEG) sensors, environmental temperature sensors, environmental pressure sensors, environmental humidity sensors, skin galvanic response sensors, and/or other types of sensors. In other examples, hearing instrument 102A and sensors 212 may include more, fewer, or different components.

Storage device(s) 202 may store data. Storage device(s) 202 may include volatile memory and may therefore not retain stored contents if powered off. Examples of volatile memories may include random access memories (RAM), dynamic random access memories (DRAM), static random access memories (SRAM), and other forms of volatile memories known in the art. Storage device(s) 202 may include non-volatile memory for long-term storage of information and may retain information after power on/off cycles. Examples of non-volatile memory may include flash memories or forms of electrically programmable memories (EPROM) or electrically erasable and programmable (EEPROM) memories.

Communication unit(s) 204 may enable hearing instrument 102A to send data to and receive data from one or more other devices, such as a device of computing system 106 (FIG. 1), another hearing instrument (e.g., hearing instrument 102B), an accessory device, a mobile device, or another type of device. Communication unit(s) 204 may enable hearing instrument 102A to use wireless or non-wireless communication technologies. For instance, communication unit(s) 204 enable hearing instrument 102A to communicate using one or more of various types of wireless technology, such as a BLUETOOTH™ technology, 3G, 4G, 4G LTE, 5G, ZigBee, WI-FI™, Near-Field Magnetic Induction (NFMI), ultrasonic communication, infrared (IR) communication, or another wireless communication technology. In some examples, communication unit(s) 204 may enable hearing instrument 102A to communicate using a cable-based technology, such as a Universal Serial Bus (USB) technology.

Hearing instruments 102 be communicatively coupled and exchange input data. Hearing instrument 102A may be configured to receive, from hearing instrument 102B, data indicating that the user has provided input to hearing instrument 102B. Hearing instrument 102A may execute a command in response to receiving the data indicating that the user has provided input to hearing instrument 102B. In an example, hearing instrument 102A receives data indicating that user 104 has provided input, hearing instruments 102A provides the input data to hearing instrument 102B for hearing instruments 102B to execute the command. In other examples, the roles of hearing instruments 102A and 102B may be reversed.

Receiver 206 includes one or more speakers for generating audible sound. The speakers of receiver 206 may generate sounds that include a range of frequencies. In some examples, the speakers of receiver 206 includes "woofers" and/or "tweeters" that provide additional frequency range. Hearing instruments 102 may use receiver 206 to produce tactile vibration in addition to audible sound.

Processor(s) 208 include processing circuits configured to perform various processing activities. Processor(s) 208 may process signals generated by microphone(s) 210 to enhance, amplify, or cancel-out particular channels within the incoming sound. Processor(s) 208 may then cause receiver 206 to generate sound based on the processed signals. In some examples, processor(s) 208 include one or more digital signal processors (DSPs). In some examples, processor(s) 208 may cause communication unit(s) 204 to transmit one or more of various types of data. For example, processor(s) 208 may cause communication unit(s) 204 to transmit data to computing system 106. Furthermore, communication unit(s) 204 may receive audio data from computing system 106 and processor(s) 208 may cause receiver 206 to output sound based on the audio data. In the example of FIG. 2, processor(s) 208 include processors 112A (FIG. 1).

Microphone(s) 210 detect incoming sound and generate one or more electrical signals (e.g., an analog or digital electrical signal) representing the incoming sound. In some examples, microphone(s) 238 include directional and/or omnidirectional microphones.

Hearing instruments 102 may be further configured to cause receiver 206 to generate an audio output that corresponds to a command. Responsive to the generation of the audio output, hearing instruments 102 may cause microphone(s) 210 to generate an audio signal indicative of the audio output while one or more speakers of receiver 206 are generating auditory indication. Hearing instruments 102 may determine, based on the audio signal, whether user 104 has touched hearing instruments 102 while the one or more speakers of receiver 206 are generating audio output. Responsive to a determination that user 104 has touched hearing instruments 102 while the one or more speakers of receiver 206 are generating audio output, hearing instrument 102 executes the command.

Hearing instruments 102 may use receiver 206 and microphone(s) 210 to determine whether hearing instruments 102 have received input consistent with user 104 touching one or more of hearing instruments 102. Hearing instruments 102 may cause one or more speakers of receiver 206 to generate an audio output that corresponds to a command. Responsive to the generation of audio output, hearing instruments 102 may obtain an audio signal via microphone(s) 210 indicative of the audio output of receiver 206. Responsive to obtaining the audio signal, hearing instruments determine whether user 104 has touched at least one of hearing instruments 102 while the one or more speakers of receiver 206 are generating the audio output. Hearing instruments 102 may determine whether user 104 has touched one of hearing instruments 102 by measuring the obtained audio signal and determining whether user 104 has dampened the audio output by touching at least one of hearing instruments 102. Responsive to the determination, hearing instruments 102 may execute a command.

Hearing instruments 102 may use receiver 206 to generate a spoken description of a notification. Hearing instruments 102, responsive to a determination of a notification, may identify one or more spoken descriptions that are associated with the notification. In addition, hearing instruments 102 may determine that a spoken description of a notification would be beneficial to user 104. Hearing instruments 102 additionally may be configured by user 104 to generate spoken descriptions when notifications are determined. Responsive to a determination that a spoken description should be generated, hearing instruments 102 identify a relevant spoken description that should be generated for user 104. Hearing instruments 102 may then generate, via receiver 206, the relevant spoken description. For example, hearing instruments 102 may determine that user 104 would benefit from the activation of a noise cancelling mode. Responsive to the determination, hearing instruments 102 may cause the one or more speakers of receiver 206 to generate a spoken description of the notification (e.g., "Would you like to turn on active noise cancellation?", "Active noise cancellation recommended", "Please press on your hearing instrument to activate active noise cancellation", etc.).

FIG. 3 is a block diagram illustrating example components of a computing device 300, in accordance with one or more aspects of this disclosure. FIG. 3 illustrates only one particular example of computing device 300, and many other example configurations of computing device 300 may exist. Computing device 300 may be a computing device in computing system 106 (FIG. 1). For instance, computing device 300 may be a cloud-based server device that is remote from hearing instruments 102. In some examples, computing device 300 is a programming device, such as a smartphone, tablet computer, personal computer, accessory device, or other type of device.

As shown in the example of FIG. 3, computing device 300 includes one or more processor(s) 302, one or more communication units 304, one or more input devices 308, one or more output devices 310, a display screen 312, a power source 314, one or more storage devices 316, and one or more communication channels 318. Computing device 300 may include other components. For example, computing device 300 may include physical buttons, microphones, speakers, communication ports, and so on. Communication channel(s) 318 may interconnect each of components 302, 304, 308, 310, 312, and 316 for inter-component communications (physically, communicatively, and/or operatively). In some examples, communication channel(s) 318 may include a system bus, a network connection, an inter-process communication data structure, or any other method for communicating data. Power source 314 may provide electrical energy to components 302, 304, 308, 310, 312 and 316.

Storage device(s) 316 may store information required for use during operation of computing device 300. In some examples, storage device(s) 316 have the primary purpose of being a short-term and not a long-term computer-readable storage medium. Storage device(s) 316 may be volatile memory and may therefore not retain stored contents if powered off. Storage device(s) 316 may be configured for long-term storage of information as non-volatile memory space and retain information after power on/off cycles. In some examples, processor(s) 302 on computing device 300 read and may execute instructions stored by storage device(s) 316.

Computing device 300 may include one or more input devices 308 that computing device 300 uses to receive user input. Examples of user input include tactile, audio, and video user input. Input device(s) 308 may include presence-sensitive screens, touch-sensitive screens, mice, keyboards, voice responsive systems, microphones or other types of devices for detecting input from a human or machine.

Communication unit(s) 304 may enable computing device 300 to send data to and receive data from one or more other computing devices (e.g., via a communications network, such as a local area network or the Internet). For instance, communication unit(s) 304 may be configured to receive data sent by hearing instrument 102, receive data generated by user 104 of hearing instrument 102, receive and send request data, receive and send messages, and so on. In some examples, communication unit(s) 304 may include wireless transmitters and receivers that enable computing device 300 to communicate wirelessly with the other computing devices. For instance, in the example of FIG. 3, communication unit(s) 304 include a radio 306 that enables computing device 300 to communicate wirelessly with other computing devices, such as hearing instruments 102 (FIG. 1). Examples of communication unit(s) 304 may include network interface cards, Ethernet cards, optical transceivers, radio frequency transceivers, or other types of devices that are able to send and receive information. Other examples of such communication units may include BLUETOOTH™, 3G, 4G, 5G, 6G, and WI-FI™ radios, Universal Serial Bus (USB) interfaces, etc. Computing device 900 may use communication unit(s) 304 to communicate with one or more hearing instruments (e.g., hearing instruments 102 (FIG. 1). Additionally, computing device 300 may use communication unit(s) 304 to communicate with one or more other remote devices.

Output device(s) 310 may generate output. Examples of output include tactile, audio, and video output. Output device(s) 310 may include presence-sensitive screens, sound cards, video graphics adapter cards, speakers, liquid crystal displays (LCD), or other types of devices for generating output. Output device(s) 310 may include display screen 312.

Processor(s) 302 may read instructions from storage device(s) 316 and may execute instructions stored by storage device(s) 316. Execution of the instructions by processor(s) 302 may configure or cause computing device 300 to provide at least some of the functionality ascribed in this disclosure to computing device 300. In some examples, storage device(s) 316 include computer-readable instructions. In some examples, such as examples where computing device 300 is a programming device used by user 104 or by a hearing professional, storage device(s) 316 store computer-readable instructions associated with a companion application 324.

Execution of instructions associated with operating system 320 may cause computing device 300 to perform various functions to manage hardware resources of computing device 300 and to provide various common services for other computer programs. Execution of instructions associated with companion application 324 by processor(s) 302 may cause computing device 300 to perform one or more of various functions.

For example, execution of instructions associated with companion application 324 may cause computing device 300 to configure communication unit(s) 304 to send and receive data from hearing instruments 102, such as data to adjust the settings of hearing instruments 102. In some examples, companion application 324 is an instance of a web application or server application. In some examples, such as examples where computing device 300 is a mobile device or other type of computing device, companion application 924 may be a native application.

Figure 4:
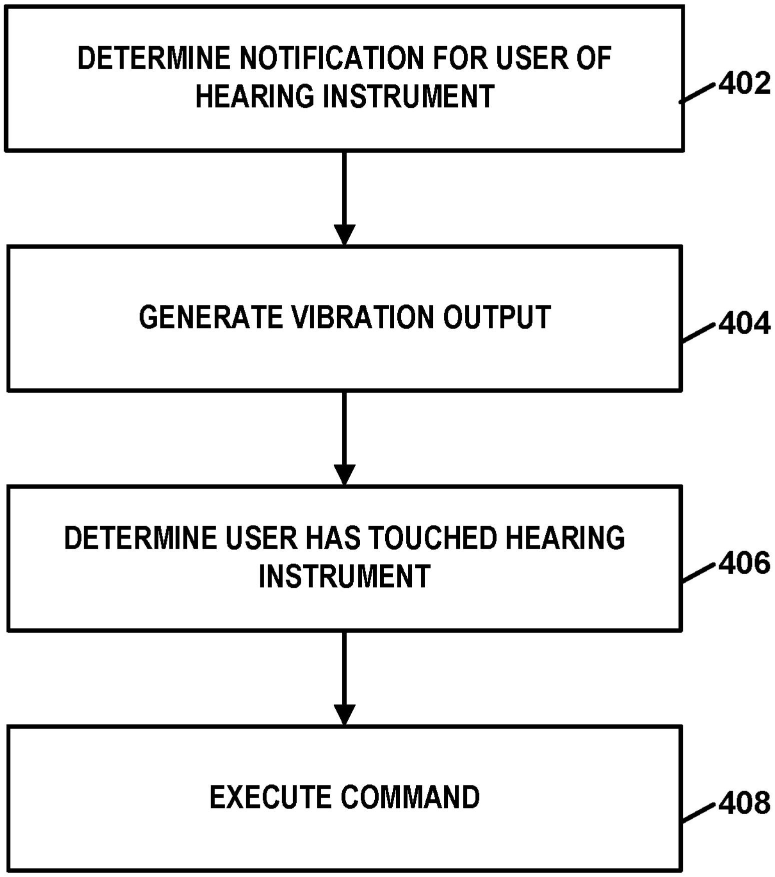
FIG. 4 is a flowchart illustrating an example operation in accordance with one or more techniques described in this disclosure.

FIG. 4 is a flowchart illustrating an example operation in accordance with one or more techniques of this disclosure. Other examples of this disclosure may include more, fewer, or different actions. In some examples, actions in the flowcharts of this disclosure may be performed in parallel or in different orders.

Hearing instruments 102 may determine a notification to user 104 (402). For example, hearing instruments 102 may determine that user 104 has entered an area with a substantial level of ambient noise and would benefit from active noise cancelation. In another example, hearing instruments 102 receive data from computing device 300 indicating that computing device 300 is receiving a call for user 104. Hearing instruments 102 may then generate vibration and simulate vibrotactile "ringing" to alert user 104 that there is a call waiting for user 104. Hearing instruments may generate vibration in one or more predetermined patterns to indicate the type of notification to a user. For example, hearing instruments 102 may generate vibration in a pattern that simulates the ringing of a phone. In another example, hearing instruments 102 may generate vibration such that vibration is generated in a series of pulses that indicate the type of notification to user 104. Hearing instruments 102 may detect a change in conditions and generate vibration to prompt user 104 to provide input. It should be appreciated that hearing instruments 102 may use vibration units 114 to generate sound audible to user 104 and detected by microphones(s) 210.

Responsive to the determination of a notification to user 104, hearing instruments 102 generate vibration output via vibration units 114 (404). Hearing instruments 102 may generate a continuous vibration, a vibration that simulates a "ringing" tone such as that produced by phones, and vibration in one or patterns. Hearing instruments 102 may generate vibration in patterns that are associated with specific notifications to indicate to user 104 the type of notification.

Hearing instruments 102 may determine whether user 104 has touched hearing instruments 102 (406). For example, hearing instruments 102 may determine that the motion signal generated by one or more sensors such as IMUs 116 and input sensors 110 is consistent with user 104 pressing their finger against hearing instruments 102 and thereby dampening the vibration generated by hearing instruments 102. In another example, hearing instruments 102 may determine that user 104 has touched hearing instruments 102 by determining that the motion signal has crossed a threshold of motion signal strength. In another example, hearing instruments 102 may determine that user 104 has touched hearing instruments 102 by determining that signals sampled by microphone(s) 210 have crossed a threshold of signal strength. In another example, responsive to obtaining motion signals consistent with user 104 touching the side of hearing instruments 102, hearing instruments 102 utilize signals obtained by microphone(s) 210 to confirm that user 104 has touched the side of hearing instruments 102. Responsive to the determination that input has been received, hearing instruments 102 execute a command (408). Hearing instruments 102 may execute a command such as activating a noise canceling mode and answering a phone call, among other commands not listed.

Figure 5:
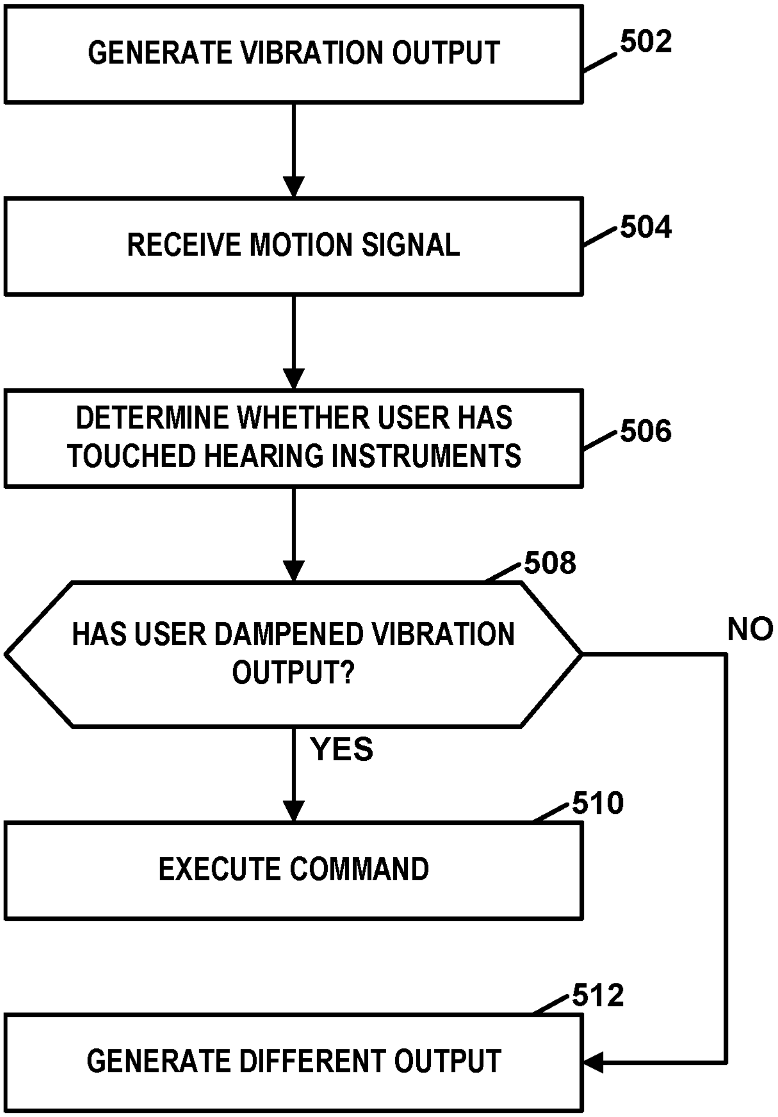
FIG. 5 is a flowchart illustrating an example operation in accordance with one or more techniques described in this disclosure.

FIG. 5 is a flowchart illustrating an example operation in accordance with one or more techniques of this disclosure. For the purposes of clarity, FIG. 5 is discussed in the context of FIG. 1.

Hearing instruments 102 may generate vibration output via one or more vibration units and receivers in response to determining a notification for user 104 (502) (e.g., as also illustrated as 404 in FIG. 4). During the generation of the vibration, hearing instruments 102 may obtain a motion signal of the vibration via one or more sensors such as IMUs 116 and input sensors 110 (504). Responsive to the receipt of the motion signal, hearing instruments 102 determine whether user 104 has touched hearing instruments 102 (506).

Hearing instruments 102 may determine whether hearing instruments 102 have received motion signals consistent with user 104 dampening vibration (508). For example, hearing instruments 102, responsive to the receipt of a motion signal, may determine that the received motion signal have crossed a threshold of signal strength indicative of dampening of the vibration by user 104. In a further example, hearing instruments 102 determine that user 104 has dampened the vibration through touching hearing instruments 102 by determining that the received motion signals differ from the motion signal of undampened vibration in one or more respects. In another example, hearing instruments 102 determine that user 104 has dampened vibration by determining that signals received by microphone(s) 210 are consistent with user 104 dampening vibration. In another example, hearing instruments 102 determine that user 104 has dampened vibration by measuring feedback path of sound measured by microphone(s) 210. Hearing instruments may receive a motion signal consistent with user 104 dampening vibration output ("YES" branch of 508). Responsive to the determination, hearing instruments 102 execute a command (510).

Hearing instruments 102 may determine that motion signals have been received consistent with user 104 not dampening vibration output ("NO" branch of 508). Responsive to the determination, hearing instruments 102 may generate a different output (512). Hearing instruments 102 may generate an output other than vibration such as a spoken description of the notification generated by receiver 206, an audio tone generated by receiver 206, and other types of output. In an example, hearing instruments 102 determine that user 104 has not touched hearing instruments 102 during the generation of vibration that was generated to indicate that user 104 may benefit from an alternative sound processing mode. Hearing instruments 102, responsive to the determination, generate a spoken description of a recommendation via receiver 206 to change the sound processing mode. In an additional example, hearing instruments 102 determine that user 104 has not touched hearing instruments 102 while hearing instruments 102 were generating vibration to indicate that user 104 was receiving a phone call. Responsive to the determination, hearing instruments 102 generate a simulation of a ringtone via receiver 206 to alert user 104 to the incoming call. Hearing instruments 102 may cease generating output in response to determining that input has not been received consistent with user 104.

Figure 6:
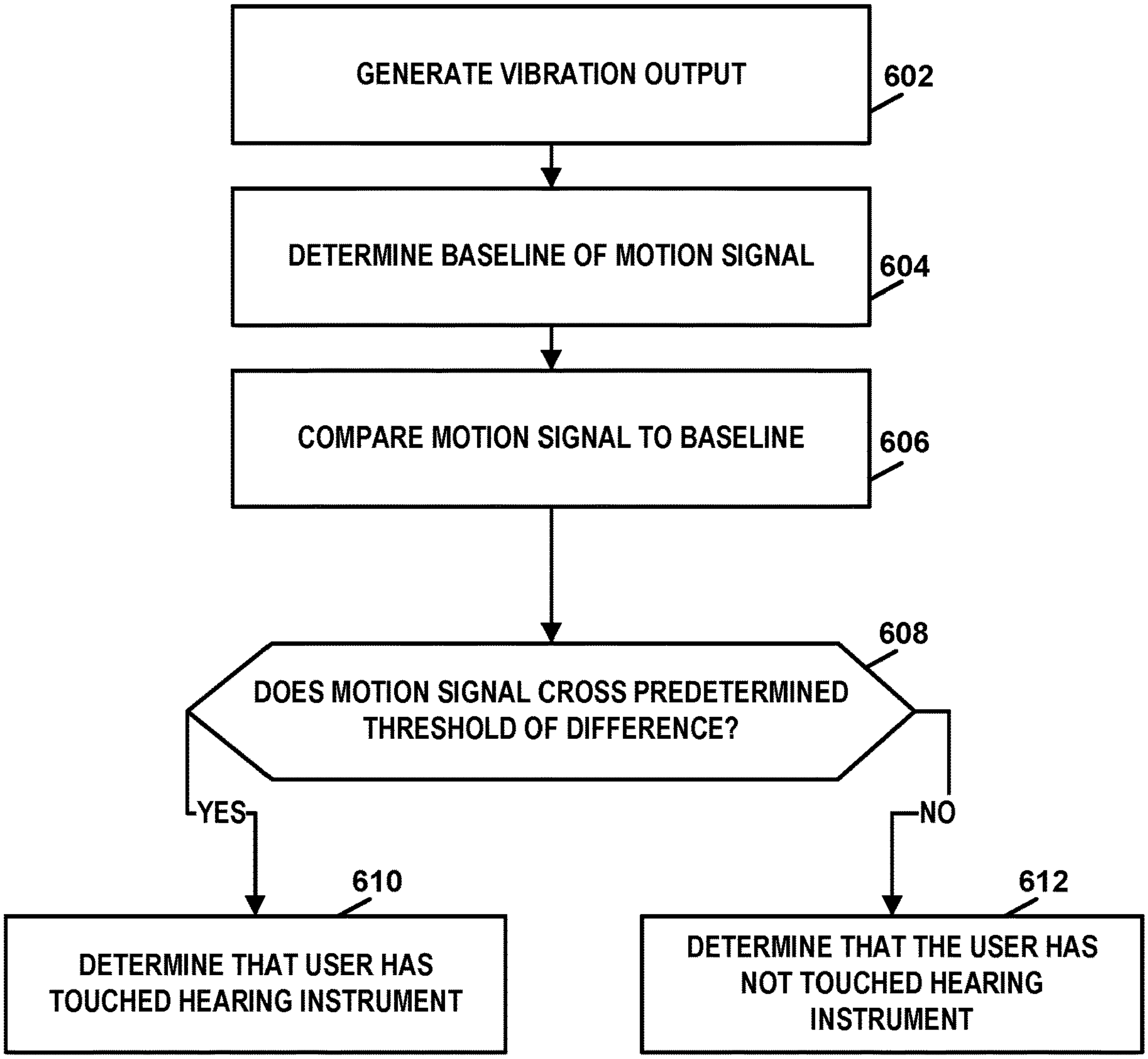
FIG. 6 is a flowchart illustrating an example operation in accordance with one or more techniques described in this disclosure.

FIG. 6 is a flowchart illustrating an example operation in accordance with one or more techniques of this disclosure. FIG. 6 illustrates an example operation similar to that as illustrated in FIG. 4 and FIG. 5 but with further context of how an example operation may occur. The example operations illustrated in FIG. 4 and FIG. 5 may include some or all of the example operation illustrated in FIG. 6. For example, the comparison of a motion signal to a baseline as illustrated in the example operation of FIG. 6 may be conducted by hearing instruments 102 in the example operations illustrated in FIG. 4 and FIG. 5.

Hearing instruments 102 may generate vibration output (602) (e.g., as illustrated by 404 in FIGS. 4 and 502 in FIG. 5). Responsive to the generation of vibration output, hearing instruments 102 determine a baseline of a motion signal received by one or more sensors such as IMUs 116 and input sensors 110 (604). Hearing instruments 102 may determine a baseline of the motion signal by measuring the motion signal received by one or more sensors such as IMUs 116 and input sensors 110 before any input from user 104. Hearing instruments 102 may additionally store data regarding the baseline from previous measurements of motion signals and use the previously generated data regarding the baseline instead of determining a new baseline.

Responsive to the determining of the baseline, hearing instruments 102 may compare data regarding the motion signal to the baseline of motion signal (606). Hearing instruments 102 may compare the motion signal received by one or more components as a motion signal to the baseline of vibration output that has been previously determined by hearing instruments 102. Hearing instruments 102 may compare the motion signal to the baseline by comparing the magnitudes of the received motion signal and the baseline to determine the magnitude of the difference between the two. Hearing instruments 102 may additionally compare the motion signal to the baseline by comparing differences in the patterns between the two (e.g., the pattern of received motion signal differs from the pattern of motion signal of the baseline).

Hearing instruments 102 may compare the received motion signal to the baseline of motion signal to determine whether the current vibration output (received as a motion signal) differs from the baseline by a predetermined threshold (608). For example, hearing instruments 102 may sample the current magnitude every 50 ms and compare the magnitude of the received motion signal to the baseline to determine whether the difference between the received motion signal and the baseline crosses a predetermined threshold of difference. In another example, hearing instruments 102 may determine that an averaged magnitude of the received motion signal measured over a period of time has crossed the predetermined threshold of difference from the baseline. In another example, hearing instruments 102 may determine that the received motion signal has not crossed a threshold of difference from the baseline. Hearing instruments 102 may use a threshold that has been configured by user 104, the manufacturer of hearing instruments, or a hearing instrument specialist. Hearing instruments 102 may provide user 104 with the ability to customize the threshold to reduce the incidence of false positives and negatives of determining whether user 104 has dampened the vibration output.

Hearing instruments 102 may determine that the vibration output measured as a motion signal crosses the threshold of difference from the baseline of vibration output ("YES" branch of 608). Responsive to the determination, hearing instruments 102 determine that input has been received consistent with user 104 providing input to hearing instruments 102 (610).

Hearing instruments 102 may determine that the vibration output measured as a motion signal has not crossed the threshold of difference from the baseline of vibration output while hearing instruments 102 were generating vibration output ("NO" branch of 608). Responsive to the determination, hearing instruments 102 determine that input has not been received consistent with user 104 providing input to hearing instruments 102 (612).

In this disclosure, ordinal terms such as "first," "second," "third," and so on, are not necessarily indicators of positions within an order, but rather may be used to distinguish different instances of the same thing. Examples provided in this disclosure may be used together, separately, or in various combinations. Furthermore, with respect to examples that involve personal data regarding a user, it may be required that such personal data only be used with the permission of the user.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media may include RAM, ROM, EEPROM, CD-ROM or other optical disk storage, magnetic disk storage, or other magnetic storage devices, flash memory, cache memory, or any other medium that can be used to store desired program code in the form of instructions or store data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A hearing instrument comprising:
a vibration unit;
a motion sensor; and
one or more processors configured to:
- cause the vibration unit to generate a vibration;
- obtain, from the motion sensor, a motion signal indicative of motion of one or more parts of the hearing instrument while the vibration unit is generating the vibration;
- determine, based on the motion signal, whether a user has further touched the hearing instrument while the vibration unit is generating the vibration by determining that the vibration has been dampened by the user touching the hearing instrument; and
- execute a command in response to determining that the user has further touched the hearing instrument while the vibration unit is generating the vibration.

2. The hearing instrument of claim 1, wherein:
the motion signal is a first motion signal;
the vibration is a first vibration; and
the one or more processors are further configured to:
- cause the vibration unit to generate a second vibration;
- obtain, from the motion sensor, a second motion signal while the vibration unit is generating the second vibration and the user is not further touching the hearing instrument;

the one or more processors are configured to, as part of determining whether the user has further touched the hearing instrument:
- compare the first motion signal and the second motion signal; and
- determine, based on the comparison of the first motion signal and the second motion signal, whether the user has further touched the hearing instrument.

3. The hearing instrument of claim 2, wherein the second vibration and second motion signal are generated before the first vibration and the first motion signal.

4. The hearing instrument of claim 1, wherein
the motion signal is a first motion signal,
the vibration is a first vibration,
the one or more processors are further configured to:
cause the vibration unit to generate a second vibration; and
obtain, from the motion sensor, a second motion signal while the vibration unit is generating the second vibration;
determine, based on the second motion signal, that the user did not further touch the hearing instrument prior to an expiration of a time period; and
refrain from executing the command in response to the determination that the user did not further touch the hearing instrument prior to the expiration of the time period.

5. The hearing instrument of claim 4, wherein the command is a first command and the one or more processors are further configured to, in response to the determination that the user did not further touch the hearing instrument prior to the expiration of the time period, execute a second command.

6. The hearing instrument of claim 1, further comprising:
a speaker; and
a microphone;
wherein the one or more processors further configured to:
cause the speaker to generate an audio output;
obtain, from the microphone, an audio signal indicative of the audio output of the speaker while the speaker is generating the audio output; and
determine, based on the audio signal, whether the user has touched the hearing instrument while the speaker is generating the audio output, and
wherein the command is a first command and the one or more processors are configured to execute a second command in response to determining that the user has touched the hearing instrument while the speaker is generating the audio output.

7. The hearing instrument of claim 1, wherein the one or more processors are further configured to:
cause a speaker to generate a spoken description of a notification; and
cause the vibration unit to generate the vibration in response to determining the notification.

8. The hearing instrument of claim 1, wherein the one or more processors are configured to:
cause the vibration unit to generate the vibration in a predetermined pattern to indicate a type of a notification to the user.

9. The hearing instrument of claim 1, wherein the hearing instrument is communicatively coupled to a second hearing instrument and is further configured to:
receive, from the second hearing instrument, data indicating that the user has provided input to the second hearing instrument; and
execute the command in response to receiving the data indicating that the user has provided the input to the second hearing instrument.

10. The hearing instrument of claim 1, wherein the hearing instrument is further configured to:
determine that alternate sound processing settings would be beneficial to the user; and
cause the vibration unit to generate the vibration in response to the determination that the alternate sound processing settings would be beneficial to the user.

11. A method comprising:
causing, by a hearing instrument, a vibration unit to generate a vibration;
obtaining, by the hearing instrument and from a motion sensor, a motion signal indicative of motion of one or more parts of the hearing instrument while the vibration unit is generating the vibration;
determining, by the hearing instrument and based on the motion signal, while the vibration unit is generating the vibration, whether a user has further touched the hearing instrument while the vibration unit is generating the vibration by determining that the vibration has been dampened by the user touching the hearing instrument; and
executing, by the hearing instrument, a command in response to determining that the user has further touched the hearing instrument while the vibration unit is generating the vibration.

12. The method of claim 11, wherein:
the motion signal is a first motion signal;
the vibration is a first vibration; and
the method further comprises:
causing, by the hearing instrument, the vibration unit to generate a second vibration; and
obtaining, by the hearing instrument and from the motion sensor, a second motion signal while the vibration unit is generating the second vibration and the user is not further touching the hearing instrument; and
as part of determining whether the user has further touched the hearing instrument:
comparing, by the hearing instrument, the first motion signal and the second motion signal; and
determining, by the hearing instrument and based on the comparison of the first motion signal and the second motion signal, whether the user has further touched the hearing instrument.

13. The method of claim 12, wherein the second vibration and second motion signal are generated before the first vibration and the first motion signal.

14. The method of claim 11, wherein
the motion signal is a first motion signal;
the vibration is a first vibration; and
further comprising:
causing, by the hearing instrument, the vibration unit to generate a second vibration;
obtaining, by the hearing instrument and from the motion sensor, a second motion signal while the vibration unit is generating the second vibration;
determining, by the hearing instrument and based on the second motion signal, that the user did not further touch the hearing instrument prior to an expiration of a time period; and
refraining, by the hearing instrument, from executing the command in response to the determination that the user did not further touch the hearing instrument prior to the expiration of the time period.

15. The method of claim 14, wherein the command is a first command and the method further comprises, in response to the determination that the user did not further touch the hearing instrument prior to the expiration of the time period, executing, by the hearing instrument, a second command.

16. The method of claim 15, further comprising:
causing, by the hearing instrument, a speaker to generate an audio output;

obtaining, by the hearing instrument and from a microphone, an audio signal indicative of the audio output of the speaker while the speaker is generating the audio output; and determining, by the hearing instrument and based on the audio signal, whether the user has further touched the hearing instrument while the speaker is generating the audio output, and wherein the command is a first command and further comprising executing, by the hearing instrument, a second command in response to determining that the user has touched the hearing instrument while the speaker is generating the audio output.

17. The method of claim 11, further comprising:

causing, by the hearing instrument, a speaker to generate a spoken description of a notification; and causing, by the hearing instrument, the vibration unit to generate the vibration in response to determining the notification.

18. The method of claim 11, further comprising:

causing the vibration unit to generate the vibration in a predetermined pattern to indicate a type of a notification to the user.

19. The method of claim 11, wherein the hearing instrument is communicatively coupled to a second hearing instrument and the method further comprises:

receiving, by the hearing instrument and from the second hearing instrument, data indicating that the user has provided input to the second hearing instrument; and executing, by the hearing instrument, the command in response to receiving the data indicating that the user has provided the input to the second hearing instrument.

20. The method of claim 11, further comprising:

determining that alternate sound processing settings would be beneficial to the user; and causing the vibration unit to generate the vibration in response to the determination that the alternate sound processing settings would be beneficial to the user.

* * * * *